US012606887B2

(12) United States Patent
Prenosil et al.

(10) Patent No.: US 12,606,887 B2
(45) Date of Patent: Apr. 21, 2026

(54) Sn-BASED ALLOY SOLDER PASTES

(71) Applicant: Heraeus Electronics GmbH & Co. KG, Hanau (DE)

(72) Inventors: Peter Prenosil, Hanau (DE); Sebastian Fritzsche, Hanau (DE); Katja Stenger, Hanau (DE)

(73) Assignee: HERAEUS ELECTRONICS GMBH & CO. KG, Hanau (DE)

( * ) Notice: Subject to any disclaimer, the term of this patent is extended or adjusted under 35 U.S.C. 154(b) by 395 days.

(21) Appl. No.: 18/558,300

(22) PCT Filed: Mar. 15, 2022

(86) PCT No.: PCT/EP2022/056601
§ 371 (c)(1),
(2) Date: Oct. 31, 2023

(87) PCT Pub. No.: WO2022/233482
PCT Pub. Date: Nov. 10, 2022

(65) Prior Publication Data
US 2024/0247340 A1     Jul. 25, 2024

(30) Foreign Application Priority Data
May 5, 2021     (EP) .................................... 21172185

(51) Int. Cl.
| | |
|---|---|
| *C22C 13/02* | (2006.01) |
| *B23K 35/02* | (2006.01) |
| *B23K 35/26* | (2006.01) |
| *B23K 35/362* | (2006.01) |
| *B23K 101/40* | (2006.01) |
| *B23K 103/08* | (2006.01) |

(52) U.S. Cl.
CPC ............ *C22C 13/02* (2013.01); *B23K 35/025* (2013.01); *B23K 35/262* (2013.01); *B23K 35/362* (2013.01); *B23K 2101/40* (2018.08); *B23K 2103/08* (2018.08)

(58) Field of Classification Search
CPC .... C22C 13/02; B23K 35/262; B23K 35/025; B23K 35/362
See application file for complete search history.

(56) References Cited

U.S. PATENT DOCUMENTS

| | | | |
|---|---|---|---|
| 5,980,822 A | 11/1999 | Moon et al. | |
| 10,456,871 B2 * | 10/2019 | Fritzsche | B23K 35/262 |
| 2012/0223430 A1 | 9/2012 | Terashima et al. | |
| 2019/0210161 A1 | 7/2019 | Arai et al. | |

FOREIGN PATENT DOCUMENTS

| | | | |
|---|---|---|---|
| EP | 2468450 | A1 | 6/2012 |
| JP | 2020142256 | A | 9/2020 |
| KR | 101142814 | B1 | 5/2012 |
| WO | 2004/096484 | A2 | 11/2004 |
| WO | 2011102034 | A1 | 8/2011 |

* cited by examiner

*Primary Examiner* — Jessee R Roe
(74) *Attorney, Agent, or Firm* — Blank Rome LLP

(57) ABSTRACT
Alloy comprising 90 to 96.8 wt. % of tin; 0.1 to 2.0 wt. % of silver; 2.0 to 4.0 wt. % of bismuth; 1.0 to 2.0 wt. % of antimony; 0.1 to 1.0 wt. % of copper; and 0.01 to 1 wt. % of germanium.

12 Claims, No Drawings

Sn-BASED ALLOY SOLDER PASTES

The invention relates to an alloy that can be used in particular as a soldering alloy.

WO 2004/096484 A2 discloses a six-component soldering alloy that, in addition to tin as the main constituent, contains ≤wt. % (% by weight) of silver, ≤wt. % of bismuth, ≤wt. % of antimony, ≤3 wt. % of copper and ≤1 wt. % of nickel. In addition to a well-balanced spectrum of properties, the six-component soldering alloy is characterized in particular by a low melting point, but at the same time allows for the production of solder connections that are stable even at high operating temperatures.

Based on the soldering alloy known from WO 2004/096484 A2, the applicant was able to obtain an alloy by replacing nickel with germanium and selecting a low silver content, which alloy surprisingly has no or only a slight tendency to form unwanted"blowholes" when used as soldering alloy during soldering in an air atmosphere. The alloy is also characterized by high thermal cycling stability. The "blowholes" are crater-like open cavities in the visible region of the solder joint. The formation of these blowholes takes place during the solidification process of the previously melted solder metal. A low tendency to form blowholes is accompanied by a high reliability of a solder joint.

The invention relates to an alloy that can be used in particular as a soldering alloy and that comprises 90 to 96.8 wt. %, preferably 91.8 to 94.5 wt. % of tin; 0.1 to 2.0 wt. %, preferably 1.3 to 1.7 wt. % of silver; 2.0 to 4.0 wt. %, preferably 2.5 to 3.5 wt. % of bismuth; 1.0 to 2.0 wt. %, preferably 1.2 to 1.8 wt. % of antimony; 0.1 to 1.0 wt. %, preferably 0.5 to 0.9 wt. % of copper; and 0.01 to 1 wt. %, preferably 0.02 to 0.25 wt. % of germanium. Preferably, the alloy according to the invention comprises 91.8 to 94.5 wt. % of tin; 1.3 to 1.7 wt. % of silver; 2.5 to 3.5 wt. % of bismuth; 1.2 to 1.8 wt. % of antimony; 0.5 to 0.9 wt. % of copper; and 0.02 to 0.25 wt. % of germanium. The alloy according to the invention can also comprise elements other than tin, silver, bismuth, antimony, copper and germanium. In addition to the elements other than tin, silver, bismuth, antimony, copper and germanium, which are comprised intentionally and deliberately, the alloy according to the invention may also comprise elements that, due to technical circumstances, may inadvertently enter the alloy according to the invention, for example as a result of an unintentional but unavoidable incorporation during production. In other words, such other elements can be present as unavoidable impurities in the alloy according to the invention, but only in very small amounts of, for example, >0 to 1,000 ppm by weight. In any case, such unavoidable impurities are not intentionally added or introduced into the alloy according to the invention.

The alloy according to the invention is particularly preferably a six-component alloy consisting of tin as a main component; 0.1 to 2.0 wt. %, preferably 1.3 to 1.7 wt. % of silver; 2.0 to 4.0 wt. %, preferably 2.5 to 3.5 wt. % of bismuth; 1.0 to 2.0 wt. %, preferably 1.2 to 1.8 wt. % of antimony; 0.1 to 1.0 wt. %, preferably 0.5 to 0.9 wt. % of copper; and 0.01 to 1 wt. %, preferably 0.02 to 0.25 wt. % of germanium. It is very particularly preferred that this six-component alloy consists of tin as a main component; 1.3 to 1.7 wt. % of silver; 2.5 to 3.5 wt. % of bismuth; 1.2 to 1.8 wt. % of antimony; 0.5 to 0.9 wt. % of copper; and 0.02 to 0.25 wt. % of germanium. The six-component alloy can also comprise elements other than tin, silver, bismuth, antimony, copper and germanium that, due to technical circumstances, may inadvertently enter it, for example as a result of an unintentional but unavoidable incorporation during production. In other words, such other elements can be present in the six-component alloy as unavoidable impurities (e.g. aluminum, arsenic, lead, cadmium, cobalt, iron, nickel, phosphorus, sulfur, zinc), but only in very small amounts of, for example, >0 to 1,000 ppm by weight. In any case, such unavoidable impurities are not intentionally added or introduced into the six-component alloy.

The solidus temperature of the alloy according to the invention is in the range of, for example, 200 to 235° C., preferably 200 to 225° C.

It has been shown that the alloy according to the invention can be used as solder metal or in solder compositions, in particular for use in the field of electronics and microelectronics. When soldered in an air atmosphere, the alloy according to the invention has only little to no tendency to form blowholes both in terms of number and size and therefore does not require the use of shielding gas or inert gas during the soldering process. The alloy according to the invention is further characterized by a pronounced thermal shock resistance of >1,500 temperature cycling cycles between −40° C. and 150° C.

The alloy according to the invention can be produced by conventional methods known to the person skilled in the art, for example by melting together the elements forming the alloy according to the invention. It is possible to use an induction furnace, and it is possible to work under vacuum or inert gas atmosphere. The materials used may have a degree of purity of, for example, ≥99.9 wt. % and more. The melt is typically poured at room temperature into a mold in which it cools and solidifies.

The alloy according to the invention, in particular the six-component alloy, can be used directly as such as solder metal. From a practical point of view, it can expediently be produced for an intended soldering task, i.e., be brought into a suitable shape for this purpose. Examples of suitable shapes, which are correspondingly prepared and free of flux, comprise solder wires, solder rods, solder foils, solder powders, solder balls and solder preforms. However, the alloy according to the invention can also be prepared as solder metal in a solder composition comprising flux, in particular as its sole solder metal component. Examples of such solder compositions are solder pastes comprising flux, solder preforms comprising flux and solder wires comprising flux, but in particular solder pastes comprising flux and solder preforms comprising flux. Flux serves, inter alia, to dissolve the oxide layer on the surfaces of the solder metal and the components to be soldered and thus to ensure better wettability during the soldering process. The same applies to oxides created by the oxygen of the air during the soldering process. Flux also reduces the interfacial tension.

Solder paste containing an alloy according to the invention can comprise or consist of, for example, 82 to 92 wt. % of an alloy according to the invention in the form of solder powder or solder balls and 8 to 18 wt. % of a flux. Such a solder paste can be produced by mixing the constituents of the flux and adding a solder powder of an alloy according to the invention. The solder powder is preferably added in multiple portions, while stirring, to an already provided mixture of the flux constituents, generally without heating.

The flux is not subject to any particular restrictions in terms of its composition, and it is therefore possible to use a conventional solder flux known to a person skilled in the art. Typically, fluxes can comprise one or more base resins (for example rosin, acrylic resin), activator (for example hydrogen halide salt of amines, organic carboxylic acids), thixotropic agent (for example hydrogenated castor oil, beeswax, carnauba wax), and often an organic solvent.

In a preferred embodiment, the flux can comprise, for example, in each case based on the total weight thereof, i) 30 to 60 wt. % of at least one acidic resin, ii) 5 to 20 wt. % of at least one low molecular weight carboxylic acid and iii) 0.4 to 10 wt. % of at least one amine.

The at least one acidic resin i) can be selected from synthetic resins with acidic groups such as, in particular, carboxyl groups. In contrast, natural resins, which may be unmodified or chemically modified, are preferred. The chemically modified natural resins may be modified natural resins modified, for example, by hydrogenation, dimerization and/or esterification of their carboxyl groups. In particular, the natural resins themselves are those of the rosin resin type.

The at least one acidic resin i) has a total acid number, for example in the range from 50 to 300 mg KOH/g. The term "acid number" used herein relates to an acid number determinable in accordance with DIN EN ISO 2114 in mg KOH/g (milligrams KOH per gram).

The at least one low molecular weight carboxylic acid ii) may preferably be selected from dicarboxylic acids. Examples include oxalic acid, adipic acid, malonic acid, succinic acid, glutaric acid, pimelic acid, suberic acid, azelaic acid, sebacic acid, undecanedioic acid, dodecanedioic acid and tridecanedioic acid.

Examples of the at least one amine iii) include N,N,N',N'-tetramethylethylenediamine, N,N,N',N'-tetraethylethylenediamine, N,N,N',N'-tetrapropylethylenediamine, N-coco-1,3-diaminopropane, 1,6-diaminohexane, 1,7-diaminoheptane, 1,8-diaminooctane, 1,9-diaminononane, and 1,10-diaminodecane, bis(2-ethylhexyl)amine, bis(2-methylhexyl)amine, diethylamine, triethylamine, cyclohexylamine, diethanolamine, triethanolamine, hydrogenated tallow alkylamine, hydrogenated (tallow alkyl)dimethylamine, and hydrogenated bis(tallow alkyl)methylamine.

In addition to the components i), ii) and iii), the flux according to the preferred embodiment may optionally comprise one or more thickeners, for example in a proportion of a total of 1 to 5 wt. %. Examples include ethyl cellulose, hydrogenated castor oil and modified or unmodified glycerol tris-12 hydroxystearin.

Furthermore, the flux according to the preferred embodiment may optionally comprise one or more organic solvents, for example in a proportion of a total of 20 to 46 wt. %. Examples include diols, alcohols, ether alcohols and ketones that are liquid at 25° C., in particular trimethylpropanol, 1,2-octanediol, 1,8-octanediol, 2,5-dimethyl-2,5-hexanediol, isobornyl cyclohexanol, glycol ether, 2-ethyl-1,3-hexanediol, n-decyl alcohol, 2-methyl-2,4-pentanediol, terpineol and isopropanol, and mixtures thereof. Examples of glycol ethers include mono-, di-, tripropylene glycol methyl ether, mono-, di-, tripropylene glycol n-butyl ether, mono-, di-, triethylene glycol n-butyl ether, ethylene glycol dimethyl ether, triethylene glycol methyl ether, diethylene glycol dibutyl ether, tetraethylene glycol dimethyl ether and diethylene glycol monohexyl ether, and mixtures thereof.

Furthermore, according to the preferred embodiment, the flux may optionally comprise one or more halogen-containing compounds, for example in a proportion of a total of 0.1 to 3 wt. %. Examples include aniline hydrochloride, glutamic acid hydrochloride, diethanolamine hydrochloride, diethanolamine hydrobromide, triethanolamine hydrochloride, triethanolamine hydrobromide and trans-2,3-dibromo-2-butene-1,4-diol.

The alloy according to the invention as a soldering alloy or a solder composition containing the alloy according to the invention can be used in particular in electronic or microelectronic applications. Examples of electronic or microelectronic applications are the fastening and at the same time electrical connection of electronic components to substrates by soldering.

Examples of electronic components include diodes, LEDs (light emitting diodes), dies, IGBTs (insulated-gate bipolar transistors), MOSFETs (metal oxide semiconductor field-effect transistors), ICs (integrated circuits), sensors, heat sinks, resistors, capacitors, coils, connecting elements (e.g. clips), baseplates, and antennas.

Examples of substrates include lead frames, PCBs (printed circuit boards), flexible electronics, ceramic substrates, metal ceramic substrates such as DCB substrates (direct copper bonded substrates), and IMS (insulated metal substrate).

The alloy according to the invention or a solder composition that contains the alloy according to the invention can also be used to produce solder deposits on substrates.

The alloy according to the invention may not only be solder metal as mentioned above, but it may also, for example, be the metal alloy of a solder joint or part of a solder joint. Such a metal alloy can also be formed, for example, only during or after completion of a soldering process, for example by alloying of more than one alloy and/or involving metal from metallic contact surfaces of electronic components or substrates connected to each other by soldering.

The alloy according to the invention may not only be solder metal as mentioned above, but it may also, for example, be the metal alloy of a solder joint or part of a solder joint. Such a metal alloy can also be formed, for example, only during or after completion of a soldering process, for example by alloying of a plurality of components, for example of individual alloy elements and/or a plurality of alloys, and/or involving metal from metallic contact surfaces of electronic components or substrates connected to each other by soldering.

EXAMPLES

1. Production of Solder Pastes and Solder Preforms

To produce soldering alloys, the various pure elements (degree of purity of 3N) were comminuted in accordance with the composition listed in Table 1 (in % by weight), weighed and melted together in an induction furnace under protective gas.

To produce the solder preforms listed in Table 1, the cast soldering alloys were rolled down in a roller to a final thickness of 75 μm. Using a laser, square solder preforms having an edge length of 1.5 mm were then cut out of these sheets. The solder preforms were subsequently cleaned in ethanol with ultrasonic assistance for 20 minutes.

To produce the solder pastes listed in Table 1, the soldering alloys were atomized as a melt under inert gas. The solder balls formed by atomization were dispersed in flux (flux composition: 40 wt. % of rosin resin (acid number 240 mg/KOH), 40 wt. % of tripropylene glycol N-butyl ether, 12 wt. % of sebacic acid, 2 wt. % of N,N,N',N'-tetramethylethylenediamine, 2 wt. % of N-coco-1,3-diaminopropane, 4 wt. % of hydrogenated castor oil). The proportion of the soldering alloy in the respective solder paste was 90 wt. % in each case.

2. Determination of Blowholes

Solder deposits of the alloys listed in Table 1 were applied to a copper plate in order to determine the blowholes.

In the case of the solder preforms, they were wetted with one drop of the aforementioned flux and placed on the copper plate.

In the case of the solder pastes, square solder deposits having an edge length of 1.5 mm were printed by means of stencil printing using a 120 μm thick stencil.

All solder deposits were soldered to copper plates under an atmosphere of air in a reflow process. For this purpose, the samples heated to 250° C. at a heating rate of about 1 K/s and kept there for 70 s. Subsequently, they were cooled and the number of blowholes formed was counted under a microscope. The numbers of blowholes listed in Table 1 represent the mean values of nine data points in each case.

3. Determination of Thermal Shock Resistance

To determine thermal shock resistance, the shear force of solder deposits was measured on samples subjected to The soldering was carried out using the aforementioned reflow profile.

After soldering, the samples provided for the thermal cycling load stress were transferred to a thermal cycling chamber and cycled in a 30 minute cycle between two chambers; the first chamber was cooled to –40° C. and the second chamber was heated to 150° C. After 1,500 cycles, the samples were taken and the quality of the solder connection was assessed by means of shear tests. For this purpose, the R1206 resistors were sheared off with a shearing chisel (width 3 mm; distance of the shearing chisel from the substrate of 150 μm) at a shear rate of 150 μm/s at the longitudinal edge of the component and the force necessary for this was detected. To determine the thermal shock resistance, the respective shear forces were related to the shear force of a structurally identical element without thermal cycling after a thermal shock test. The values of this shear force reduction after thermal cycling are given in % in Table 1.

TABLE 1

Overview of alloys according to the invention (1-16) and comparison alloys (R1-R13), as well as results with regard to shear force reduction after thermal cycling TWB (in %) and number of blowholes formed.

| Sample | Mold | Sn | Ag | Cu | Bi | Sb | Ni | Ge | Shear force reduction after thermal cycling | Blowholes |
|---|---|---|---|---|---|---|---|---|---|---|
| R1 | Preform | Remainder | 3.8 | 0.7 | 3 | 1.5 | 0.15 | — | 43.5 | 81 |
| R2 | Preform | | 1 | 0.7 | 1 | 1 | — | 0.06 | 57.7 | 13 |
| R3 | Preform | | 1.5 | 0.7 | 1.5 | 3 | — | 0.25 | 63.7 | 3 |
| R4 | Preform | | 1.5 | 0.7 | 3 | 1.5 | 0.15 | 0.25 | 39.4 | 42 |
| R5 | Preform | | 1.5 | 0.03 | 3 | 1.5 | — | 0.03 | 36.6 | 133 |
| R6 | Preform | | 1.5 | 0.7 | 4.5 | 1.5 | — | 0.03 | 26.7 | 94 |
| R7 | Preform | | 1.5 | 0.7 | 3 | 0.7 | — | 0.03 | 40.9 | 82 |
| R8 | Preform | | 1.5 | 0.7 | 3 | 1.5 | — | 1.2 | 45.3 | 15 |
| R9 | Paste | | 3.8 | 0.7 | 3 | 1.5 | 0.15 | — | 42.4 | 69 |
| R10 | Paste | | 1.5 | 0.7 | 3 | 1.5 | 0.15 | 0.25 | 31.7 | 53 |
| R11 | Paste | | 1.5 | 0.7 | 3 | 1.5 | 0.25 | — | 40.7 | 77 |
| R12 | Paste | | 1.5 | 0.03 | 3 | 1.5 | — | 0.03 | 38.1 | 153 |
| R13 | Paste | | 1.5 | 0.7 | 4.5 | 1.5 | — | 0.03 | 24.9 | 98 |
| 1 | Preform | Remainder | 1.5 | 0.7 | 3 | 1.5 | — | 0.01 | 33.9 | 17 |
| 2 | Preform | | 1.5 | 0.7 | 3 | 1.5 | — | 0.03 | 36.2 | 25 |
| 3 | Preform | | 1.5 | 0.7 | 3 | 1.5 | — | 0.25 | 38.7 | 28 |
| 4 | Preform | | 0.3 | 0.7 | 3 | 1.5 | — | 0.03 | 36.5 | 27 |
| 5 | Preform | | 1.7 | 0.7 | 3 | 1.5 | — | 0.03 | 36.0 | 14 |
| 6 | Preform | | 1.5 | 0.3 | 3 | 1.5 | — | 0.03 | 36.8 | 35 |
| 7 | Preform | | 1.5 | 0.9 | 3 | 1.5 | — | 0.03 | 36.1 | 23 |
| 8 | Preform | | 1.5 | 0.7 | 2.5 | 1.5 | — | 0.03 | 42.0 | 20 |
| 9 | Preform | | 1.5 | 0.7 | 3.5 | 1.5 | — | 0.03 | 32.1 | 33 |
| 10 | Preform | | 1.5 | 0.7 | 3 | 1.2 | — | 0.03 | 38.4 | 22 |
| 11 | Preform | | 1.5 | 0.7 | 3 | 2 | — | 0.03 | 35.3 | 25 |
| 12 | Paste | | 1.5 | 0.7 | 3 | 1.5 | — | 0.01 | 31.6 | 20 |
| 13 | Paste | | 1.5 | 0.7 | 3 | 1.5 | — | 0.03 | 34.9 | 27 |
| 14 | Paste | | 1.5 | 0.7 | 3 | 1.5 | — | 0.25 | 36.5 | 31 |
| 15 | Paste | | 1.7 | 0.7 | 3 | 1.5 | — | 0.03 | 37.4 | 22 |
| 16 | Paste | | 1.5 | 0.7 | 2.5 | 1.5 | — | 0.03 | 39.2 | 23 | thermal shock and on samples not subjected to thermal shock. For this purpose, solder deposits were applied to tin-plated contact pads of printed circuit boards (FR4 material) and subsequently fitted with R1206 resistors measuring 3.2 mm×1.6 mm×0.8 mm. In the case of the solder preforms, the solder deposits were in each case wetted with one drop of the aforementioned flux on the top and on the bottom prior to fitting.

In the case of the solder paste, this was applied to the contact pads by means of stencil printing with a square dimension of 1.5 mm edge length using a 120 μm thick stencil.

The invention claimed is:

1. A solder paste comprising:

82 to 92 wt. % of an alloy consisting essentially of:

90 to 96.8 wt. % of tin;

0.1 to 2.0 wt. % of silver;

2.0 to 4.0 wt. % of bismuth;

1.0 to 2.0 wt. % of antimony;

0.1 to 1.0 wt. % of copper; and 0.01 to 1 wt. % of germanium; and 8 to 18 wt. % of a flux.

2. The solder paste of claim 1, wherein the alloy consists essentially of 91.8 to 94.5 wt. % of tin; 1.3 to 1.7 wt. % of silver; 2.5 to 3.5 wt. % of bismuth; 1.2 to 1.8 wt. % of antimony; 0.5 to 0.9 wt. % of copper; and 0.02 to 0.25 wt. % of germanium.

3. The solder paste of claim 2, wherein the alloy contains less than 1000 ppm of impurities.

4. The solder paste of claim 1, wherein the flux comprises:

i) 30 to 60 wt. % of at least one acidic resin, ii) 5 to 20 wt. % of at least one low molecular weight carboxylic acid and iii) 0.4 to 10 wt. % of at least one amine.

5. The solder paste of claim 4, wherein the alloy contains less than 1000 ppm of impurities.

6. The solder paste of claim 4, wherein flux further comprises 1 to 5 wt % of one or more thickeners.

7. The solder paste of claim 1, wherein the alloy has a solidus temperature in the range of 200 to 235° C.

8. A substrate comprising a solder deposit located on a surface of the substrate, the solder deposit produced from a solder paste according to claim 1.

9. The substrate of claim 8, wherein the substrate is a lead frame, a printed circuit board, a ceramic substrate, a metal ceramic substrate or an insulated metal substrate.

10. An electronic component comprising a solder joint, the solder joint produced from a solder paste according to claim 1.

11. The electronic component of claim 10, wherein the electronic component is a diode, a die, an insulated-gate bipolar transistor, a metal oxide semiconductor field-effect transistor, an integrated circuit, a sensor, a heat sink, a resistor, a capacitor, a coil, a connecting element, a base-plate, or an antenna.

12. The solder paste of claim 1, wherein the alloy contains less than 1000 ppm of impurities.

* * * * *